United States Patent
Iyer et al.

(10) Patent No.: US 11,562,475 B2
(45) Date of Patent: Jan. 24, 2023

(54) SYSTEM AND METHOD FOR DETECTING PRODUCT DEFECTS ACROSS MANUFACTURING PROCESS

(71) Applicant: Wipro Limited, Bangalore (IN)

(72) Inventors: Manjunath Ramachandra Iyer, Bangalore (IN); Chandrashekar Bangalore Nagaraj, Bangalore (IN); Shashidhar Soppin, Bangalore (IN)

(73) Assignee: Wipro Limited, Bangalore (IN)

( * ) Notice: Subject to any disclaimer, the term of this patent is extended or adjusted under 35 U.S.C. 154(b) by 206 days.

(21) Appl. No.: 17/169,713

(22) Filed: Feb. 8, 2021

(65) Prior Publication Data
US 2022/0189007 A1    Jun. 16, 2022

(30) Foreign Application Priority Data

Dec. 15, 2020 (IN) .............................. 202041054467

(51) Int. Cl.
*G06T 7/00* (2017.01)
*G06T 7/11* (2017.01)
(Continued)

(52) U.S. Cl.
CPC .............. *G06T 7/0004* (2013.01); *G06T 7/11* (2017.01); *G06T 7/62* (2017.01); *G06T 7/90* (2017.01)

(58) Field of Classification Search
CPC . G06T 7/0004; G06T 7/62; G06T 7/11; G06T 7/90
(Continued)

(56) References Cited

U.S. PATENT DOCUMENTS

| | | | | |
|---|---|---|---|---|
| 6,973,127 | B1 * | 12/2005 | Kolesnik ................ | H04N 19/61 375/E7.045 |
| 2010/0057237 | A1 * | 3/2010 | Kettaneh .......... | G05B 19/41885 700/103 |

(Continued)

FOREIGN PATENT DOCUMENTS

CN     106204614 B    1/2019

OTHER PUBLICATIONS

"Manufacturing Package Fault Detection Using Deep Learning", 2018, White Paper (4 pages).

*Primary Examiner* — Gabriel I Garcia
(74) *Attorney, Agent, or Firm* — Finnegan, Henderson, Farabow, Garrett & Dunner, LLP (57) ABSTRACT

Disclosed herein is method and fault detection system for detecting faults in one or more products. In an embodiment, method comprises generating plurality of wavelet coefficients corresponding to transformed images of each of the one or more products and determining a set of invariant features from the plurality of wavelet coefficients. Further, a dynamic set of invariant features is generated by grouping invariant features into a set of groups based on type of the one or more products. Subsequently, the dynamic set of invariant features is quantized based on a predetermined quantization threshold and a representative coefficient signature is associated for each group in the dynamic set of invariant features. Finally, faults in the one or more products are detected by comparing coefficient signatures associated with the one or more products with the representative coefficient signature of each group in the dynamic set of invariant features. In an embodiment, the present disclosure helps in accurate detection of faults in one or more products irrespective of type and characteristics of one or more products.

18 Claims, 5 Drawing Sheets

(51) Int. Cl.
*G06T 7/62* (2017.01)
*G06T 7/90* (2017.01)

(58) Field of Classification Search
USPC .......................................................... 382/141
See application file for complete search history.

(56) References Cited

U.S. PATENT DOCUMENTS

| | | |
|---|---|---|
| 2022/0011241 A1* | 1/2022 | Ono .................... G01N 21/892 |
| 2022/0091576 A1* | 3/2022 | Ouyang ................ G06N 20/00 |
| 2022/0189007 A1* | 6/2022 | Iyer ........................... G06T 7/90 |
| 2022/0196571 A1* | 6/2022 | Fam .................. G01N 21/8806 |

* cited by examiner

SYSTEM AND METHOD FOR DETECTING PRODUCT DEFECTS ACROSS MANUFACTURING PROCESS

TECHNICAL FIELD

The present subject matter is, in general, related to manufacturing plants, but not exclusively, to a method and system for detecting product defects in a manufacturing process.

BACKGROUND

Generally, in product plant or a manufacturing plant, it is estimated that around 15% of all the products manufactured may have at least one defect. Defective products not only bring down the productivity, but also increase expenditures in terms of reworking the defective products. Time and manual efforts required for identifying the defective products and reworking or replacing them also increases expenditures. Therefore, efficient handling of the defective products becomes crucial for enhancing overall productivity of the production or manufacturing process.

The existing mechanisms for detecting the faults and/or defects in the products across manufacturing industry are costly, time consuming and use complex mechanisms. That is, the existing fault detection mechanisms use complex techniques, require intense manual efforts and consume more time for accurate detection of the faults. Further, certain other fault detection mechanisms, which use Artificial Intelligence (AI) based deep learning models for fault detection, require huge datasets comprising information of all types of faults for training the model. Also, once trained, these models are capable of detecting only those faults which are already pre-stored in the datasets and used during the training. In addition, these models consume great deal of computational resources both during training and run-time of the model.

Essentially, the existing AI based fault detection mechanisms work well only for products of a fixed size and specific orientation of the products where the faults can generally occur. Since the template of the faults are fixed for these models, there is a practical limit on the range of faults that may be successfully detected by these models. Therefore, it may be desirable to have a universal fault detection mechanism, which detects all types of faults in the products, irrespective of product characteristics and nature of the fault.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for detecting faults in one or more products. The method comprises generating a plurality of wavelet coefficients corresponding to each of one or more transformed images of each of the one or more products. Each of the plurality of wavelet coefficients correspond to at least one characteristic of each of the one or more products. Further, the method comprises determining a set of invariant features, corresponding to the one or more products, from the plurality of wavelet coefficients by comparing values of the plurality of wavelet coefficients with corresponding predetermined threshold coefficient values. Thereafter, the method comprises generating a dynamic set of invariant features by grouping the invariant features into a set of groups based on type of the one or more products. Each group in the set of groups comprises wavelet coefficients distinct to the type of the one or more products. Further, the method comprises quantizing the dynamic set of invariant features based on a predetermined quantization threshold and associating a representative coefficient signature for each group in the dynamic set of invariant features. Finally, the method comprises detecting the faults in the one or more products based on comparison of coefficient signatures associated with the one or more products with the representative coefficient signature of each group in the dynamic set of invariant features. Detecting the faults further comprises identifying mismatch of coefficient signatures, associated with the one or more products, with the representative coefficient signature of each group in the dynamic set of invariant features.

Further, the present disclosure relates to a fault detection system for detecting faults in one or more products. The fault detection system comprises a processor and a memory. The memory is communicatively coupled to the processor and stores processor-executable instructions, which on execution, cause the processor to generate a plurality of wavelet coefficients corresponding to each of one or more transformed images of each of the one or more products. Each of the plurality of wavelet coefficients correspond to at least one characteristic of the one or more products. Further, the instructions cause the processor to determine a set of invariant features, corresponding to the one or more products, from the plurality of wavelet coefficients by comparing values of the plurality of wavelet coefficients with corresponding predetermined threshold coefficient values. Thereafter, the instructions cause the processor to generate a dynamic set of invariant features by grouping the invariant features into a set of groups based on type of the one or more products. Each group in the set of groups comprises wavelet coefficients distinct to the type of the one or more products. Further, the instructions cause the processor to quantize the dynamic set of invariant features based on a predetermined quantization threshold and associating a representative coefficient signature for each group in the dynamic set of invariant features. Finally, the instructions cause the processor to detect the faults in the one or more products based on comparison of coefficient signatures associated with the one or more products with the representative coefficient signature of each group in the dynamic set of invariant features. The faults are detected by identifying mismatch of coefficient signatures, associated with the one or more products, with the representative coefficient signature of each group in the dynamic set of invariant features.

Furthermore, the present disclosure relates to a non-transitory computer readable medium including instructions stored thereon that when processed by at least one processor cause a fault detection system for detecting faults in one or more products. Initially, the instructions cause the fault detection system to generate a plurality of wavelet coefficients corresponding to each of one or more transformed images of the one or more products. Each of the plurality of wavelet coefficients correspond to at least one characteristic of the one or more products. Further, the instructions cause the fault detection system to determine a set of invariant features, corresponding to the one or more products, from the plurality of wavelet coefficients by comparing values of the plurality of wavelet coefficients with corresponding predetermined threshold coefficient values. Thereafter, the instructions cause the fault detection system to generate a dynamic set of invariant features by grouping the invariant features into a set of groups based on type of the one or more products. Each group in the set of groups comprises wavelet coefficients distinct to the type of the one or more products. Further, the instructions cause the fault detection system to quantize the dynamic set of invariant features based on a predetermined quantization threshold and associating a representative coefficient signature for each group in the dynamic set of invariant features. Finally, the instructions cause the fault detection system to detect the faults in the one or more products based on comparison of coefficient signatures associated with the one or more products with the representative coefficient signature of each group in the dynamic set of invariant features. The faults are detected by identifying mismatch of coefficient signatures, associated with the one or more products, with the representative coefficient signature of each group in the dynamic set of invariant features.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a fault detection system for detecting faults in one or more products being produced in a manufacturing plant or an industrial site. The present disclosure provides a mechanism for identifying faulty objects or industrial products, while trying to address some of the limitations in the conventional fault detection mechanisms.

In some embodiments, the present disclosure provides a mechanism for detecting faults across the manufacturing industry using wavelets and Grover's technique. Initially, a wavelet transformation and related coefficients are created using techniques such as Daubechies wavelets transform. Further, the invariant wavelet coefficients are detected using the images of objects in different orientation. Also, a dynamic range of wavelet coefficients is selected for similar type of objects but of different sizes. Subsequently, the wavelet coefficients are quantized to generate unique signatures for the objects enabling optimized search. In an embodiment, the present disclosure performs fitment identification and fault detection using segmentation and optimized search techniques, which are disclosed in greater detail in the further sections of the present disclosure.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
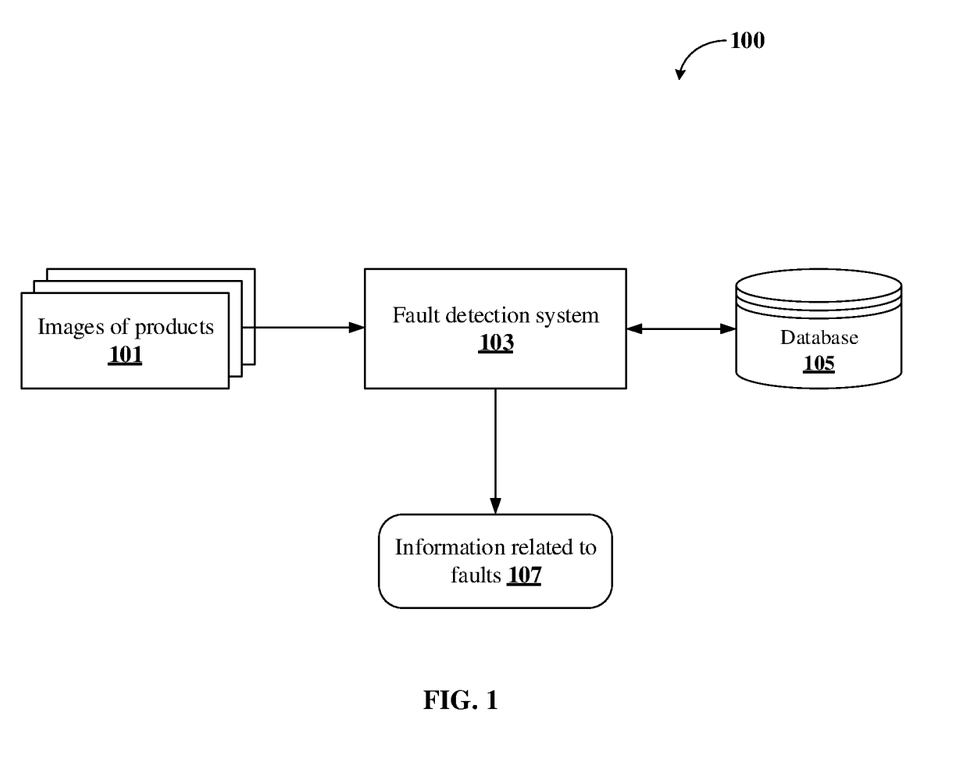
FIG. 1 illustrates an exemplary environment of detecting faults in one or more products in accordance with some embodiments of the present disclosure.

FIG. 1 illustrates an exemplary environment for detecting faults in one or more products in accordance with some embodiments of the present disclosure.

In an embodiment, the environment 100 may be a production site and/or a manufacturing plant in which one or more products are being produced or manufactured. In an embodiment, the one or more products may include a wide range and variety of products including, without limitation, nuts, bolts, screws, gearboxes, ball joints, auto electrical parts, brake pads, brake horses and the like. In an embodiment, one or more faults in the one or more products may be identified using the fault detection system 103 configured at the environment 100.

In an embodiment, the fault detection system 103 may be any computing system capable of being configured to analyse one or more images of the one or more products 101 and detect the one or more faults in accordance with various embodiments of the claimed invention. As an example, the fault detection system 103 may include, without limiting to, a desktop computer, a laptop, a smartphone or even a server computer. In an implementation, the fault detection system 103 may be configured at the environment 100 and locally operated at the production site. In an alternative implementation, the fault detection system 103 may be configured and operated from a remote location and the one or more images of the one or more products 101 may be transmitted to the fault detection system 103 over a wired and/or wireless communication channel. Further, the fault detection system 103 may be interfaced with a database 105 for retrieving information such as, without limitation, historical images of the one or more products 101, predetermined threshold values and the like, which are required for detecting faults in the one or more products. In an embodiment, the fault detection system 103 and the database 105 may be connected over a wired and/or wireless communication channel.

In an embodiment, the one or more images of the one or more products 101 may be captured using a plurality of image capturing units (not shown in FIG. 1) configured at the environment 100. As an example, the plurality of image capturing units may be configured along a conveyer belt carrying the one or more products, such that, the plurality of image capturing units capture images of the one or more products from multiple orientations and light intensities. Further, the plurality of image capturing units may be interfaced with the fault detection system 103 for dynamically transmitting the captured images of the one or more products 101 to the fault detection system 103 for further analysis.

In an embodiment, upon receiving the one or more images of the one or more products 101, the fault detection system 103 may apply one or more image pre-processing and/or image transformation techniques on each of the one or more images of the one or more products 101 to obtain one or more transformed images of the one or more products 101. As an example, the one or more pre-processing techniques applied to the one or more images may include, without limitation, cropping, scaling, rotation, and other filtering techniques, which make the one or more images suitable for further processing.

In an embodiment, after obtaining the one or more transformed images of the one or more products 101, the fault detection system 103 may generate a plurality of wavelet coefficients corresponding to each of the one or more transformed images. Here, the each of the plurality of wavelet coefficients may correspond to at least one characteristic of the one or more products. As an example, the characteristic of the one or more products may include, without limiting to, type of the one or more products (i.e., screws, nuts, bolts or other types), shape of the one or more products, dimensions of the one or more products (length, breadth, thickness, diameter and the like) and colour of the one or more products.

In an embodiment, once the wavelet coefficients are generated, the fault detection system 103 may determine a set of invariant features corresponding to the one or more products from the plurality of wavelet coefficients. The set of invariant features may be determined by comparing values of the plurality of wavelet coefficients with corresponding predetermined threshold coefficient values. In other words, the fault detection system 103 may scan through each of the plurality of wavelet coefficients and segregate them into a group of wavelet coefficients that are common across each of the one or more transformed images and whose values are comparable to the predetermined threshold coefficient values. Here, the predetermined threshold coefficient value may be a dynamic value defined by a user of the fault detection system 103.

In an embodiment, values associated with the one or more transformed images after applying various filters may be converted into a residual pyramid, such that, each of the values correspond to various features of an image. In each layer of the pyramid, the feature values may be down sampled to minimize the feature values as much as possible. In other words, the threshold values may depend on the feature in the image being considered. For example, length of the screw in the image may be a feature to be considered. Accordingly, each of these features to be considered may be figured out and/or pre-determined by a domain expert before analysing the images. In an embodiment, a one-time mapping of the features may be sufficient to cover subsequent occurrences of the same feature in other objects. As an example, there may be 68 predetermined threshold coefficient values.

In an embodiment, subsequent to determining the set of invariant features, the fault detection system 103 may generate a dynamic set of invariant features by grouping the invariant features into a set of groups based on type of the one or more products. Consequently, each group in the set of groups comprises wavelet coefficients that are distinct to the type of the one or more products. Further, the fault detection system 103 may quantize the dynamic set of invariant features based on a predetermined quantization threshold and associate and/or assign a representative coefficient signature for each group in the dynamic set of invariant features. In other words, the fault detection system 103 may divide the dynamic set of invariant features into multiple groups based on the quantization threshold and represent each group with a unique representative coefficient signature, which helps to uniquely select the group of invariant features that belong to a required coefficient signature. That is, by quantizing the dynamic set of invariant features, the fault detection system 103 optimizes the way in which the invariant features are stored, and thereby also optimizes the search and/or retrieval of the stored set of invariant features during real-time processing of the images of the one or more products 101.

As an example, consider a full-size image of an object such as a screw, which has a length of 2 inches. A wavelet transformation corresponding to the said image may be generated, for example, as shown in Table A below.

TABLE A

| Exemplary representation of wavelet transformation | | | |
| --- | --- | --- | --- |
| 402 | 465.5 | 31 | 32.5 |
| 362 | 375.5 | −73 | −10.5 |
| 68 | 33.5 | −43 | −33.5 |
| 15 | 12.5 | −36 | −101.5 |

Subsequently, the coefficients corresponding to an artifact such as a 'tilt' in the thread of the screw (which is represented by an element on 1st row and 4th column of Table A, that is 32.5) may be quantized to a nearest value. That is, in the above example, the value 32.5 may be quantized to 33.

Further, a threshold for tolerance value may be set. In an embodiment, if the value of this coefficient for other images is in a range of 32 to 34, no defects may be detected. On the other hand, if the value is outside this range, the corresponding screw may be rejected with an appropriate feedback.

In an embodiment, upon quantizing the dynamic set of invariant features, the fault detection system 103 may detect the faults in the one or more products based on a comparison of the coefficient signatures associated with the one or more products with the representative coefficient signature of each group in the dynamic set of invariant features. Here, the faults may be detected when a mismatch is identified between the coefficient signatures associated with the one or more products and the representative coefficient signature of each group in the dynamic set of invariant features. Subsequently, the fault detection system 103 may render a result comprising information related to the faults 107, indicating whether the product is faulty or not, on a user interface associated with the fault detection system 103 to facilitate one or more users of the fault detection system 103 to handle the one or more faulty products.

Figure 2:
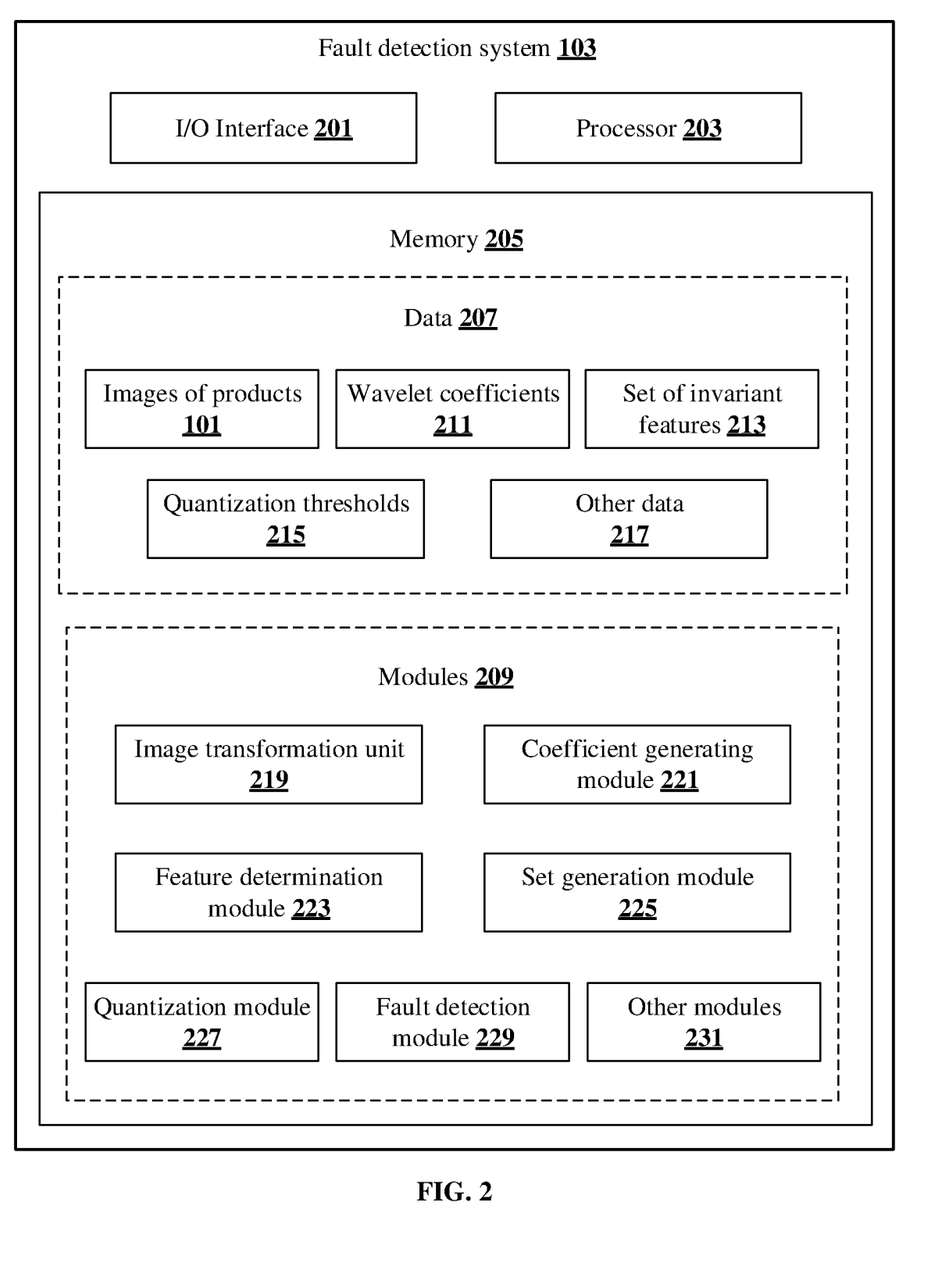
FIG. 2 shows a detailed block diagram of a fault detection system in accordance with some embodiments of the present disclosure.

FIG. 2 shows a detailed block diagram of a fault detection system 103 in accordance with some embodiments of the present disclosure.

In some implementations, the fault detection system 103 may include an I/O interface 201, a processor 203 and a memory 205. The I/O interface 201 may be communicatively interfaced with an image capturing unit for receiving one or more images of one or more products 101 to be analyzed for detection of faults. Further, the I/O interface 201 may be communicatively interfaced with a database 105 for retrieving one or more reference images of one or more products 101. The memory 205 may be communicatively coupled to the processor 203 and may store data 207 and one or more modules 209. The processor 203 may be configured to perform one or more functions of the fault detection system 103 for detecting faults in the one or more products, using the data 207 and the one or more modules 209.

In an embodiment, the data 207 stored in the memory 205 may include, without limitation, the images of one or more products 101 (alternatively referred as one or more images 101 or one or more images of the one or more products 101), wavelet coefficients 211, set of invariant features 213, quantization thresholds 215 and other data 217. In some implementations, the data 207 may be stored within the memory 205 in the form of various data structures. Additionally, the data 207 may be organized using data models, such as relational or hierarchical data models. The other data 217 may include various temporary data and files generated by the one or more modules 209 while performing various functions of the fault detection system 103. As an example, the other data 217 may include, without limitation, one or more reference and/or historical images of the one or more products 101, predetermined threshold coefficient values and predetermined quantization threshold values.

In an embodiment, the images of one or more products 101 may be captured by a plurality of image capturing units deployed at a manufacturing site and associated with the fault detection system 103. In an embodiment, each of the one or more images of the one or more products 101 may be captured from distinct views, orientations and in distinct light intensities for capturing all possible details of the one or more products.

In an embodiment, the wavelet coefficients 211 may be generated and/or extracted from each of the one or more transformed images of the one or more products 101 by analysing the one or more transformed images using a predetermined wavelet transform technique such as Daubechies wavelet transform. In an embodiment, each of the plurality of wavelet coefficients 211 may correspond to at least one characteristic of the one or more products. In some implementations, the wavelet coefficients 211 may be generated for different frequency bands of the one or more images of the one or more products 101.

In an embodiment, set of invariant features 213 may be obtained from the plurality of wavelet coefficients 211 by comparing values of the plurality of wavelet coefficients 211 with corresponding predetermined threshold coefficient values. In an embodiment, the set of invariant features 213 may be detected by identifying the features common across each of the one or more images of the one or more products 101 and confirming that their values are within the predetermined threshold coefficient values. In an embodiment, the set of invariant features 213 may be selected based on the attributes of a same type of object.

In an embodiment, quantization thresholds 215 may be used for quantizing the dynamic set of invariant features 213. In an embodiment, the value of the quantization thresholds 215 may be dynamically selected based on variation in values of the wavelet coefficients 211 comprised in the dynamic set of invariant features 213.

In an embodiment, the data 207 may be processed by the one or more modules 209 of the fault detection system 103. In some implementations, the one or more modules 209 may be communicatively coupled to the processor 203 for performing one or more functions of the fault detection system 103. In an implementation, the one or more modules 209 may include, without limiting to, an image transformation unit 219, a coefficient generating module 221, a feature determination module 223, a set generation module 225, a quantization module 227, a fault detection module 229 and other modules 231.

As used herein, the term module may refer to an Application Specific Integrated Circuit (ASIC), an electronic circuit, a hardware processor (shared, dedicated, or group) and memory that execute one or more software or firmware programs, a combinational logic circuit, and/or other suitable components that provide the described functionality. In an implementation, each of the one or more modules 209 may be configured as stand-alone hardware computing units. In an embodiment, the other modules 231 may be used to perform various miscellaneous functionalities of the fault detection system 103. It will be appreciated that such one or more modules 209 may be represented as a single module or a combination of different modules.

In an embodiment, the image transformation unit 219 may be configured for transforming and/or pre-processing each of the one or more images of the one or more products 101 using one or more predetermined image transformation techniques. As an example, the image transformation techniques performed on one or more images of the one or more products 101 may include, without limiting to, cropping, scaling, rotation, and other filtering techniques which make the one or more images suitable for further processing. In an embodiment, the image transformation unit 219 may store each of the one or more transformed images in the database 105 associated with the fault detection system 103 for future reference and comparison purposes.

In an embodiment, the coefficient generating module 221 may be configured for generating a plurality of wavelet coefficients 211 corresponding to each of one or more transformed images of the one or more products 101, such that each of the plurality of wavelet coefficients 211 correspond to at least one characteristic of the one or more products. In other words, each of the wavelet coefficients 211 may serve as template for different faults and may be independent of size and orientation of the object as well as the faults in the object. In the process, the coefficient generating module 221 may use a predetermined transformation technique such as the Daubechies transform for generating the coefficient wavelets. Here, the two-dimensional (2D) images of the one or more products 101 may be converted or compressed to corresponding one-dimensional (1D) wavelet coefficients 211 as the representative features of the 2D images of the one or more products 101.

Additionally, in some embodiments, the wavelet coefficients 211 module may map the plurality of wavelet coefficients 211 with the stored images of the one or more products 101, such that the mapped wavelet coefficients 211 serve as a template and help to identify type of faults, if any, in the one or more products during real-time processing of the images of the one or more products 101.

In an embodiment, the feature determination module 223 may be configured for determining a set of invariant features 213, corresponding to the one or more products, from the plurality of wavelet coefficients 211. The feature determination module 223 may determine the set of invariant features 213 by comparing the values of the plurality of wavelet coefficients 211 with the corresponding predetermined threshold coefficient values. In an embodiment, the feature determination module 223 may detect the invariant features by identifying the set of features, which are common across all the images of the one or more products 101 and whose values are comparable within a certain threshold coefficient value. This may be performed among images of the one or more products 101 that are of same type. As an example, considering there are two types of products to be analyzed, namely bolts and washers, the feature identification may be separately performed for the set of images of the bolts and the washers, respectively. Here, only the determined invariant features may be taken forward for further processing and all the remaining features may be ignored. In an embodiment, the threshold coefficient value may be determined based on historically observed deviations from expected class of faults within each type of the one or more products.

In an embodiment, the set generation module 225 may be configured for generating a dynamic set of invariant features 213 by grouping the invariant features into a set of groups based on type of the one or more products. In an embodiment, each group in the set of groups generated by the set generation module 225 may comprise wavelet coefficients 211 that may be distinct to each type of the one or more products being tested for faults. To start with, the set generation module 225 may collect the invariant features for the images of one or more products 101, which are of same type but vary in attributes such as length, width, circumference, depth, and the like. Further, the set generation module 225 may form a dynamic set that includes a group of invariant features of each object type as an element. The specialty of this dynamic set would be that each group in the dynamic set would include almost similar invariant features and differ only for attributes distinct to them. Subsequently, each group in the dynamic set may be compared and a dynamic range of the coefficient values may be derived from them. These dynamic range of the coefficient values may represent the features of the distinct attribute of the product type. The final dynamic set of the invariant features may include group of coefficients for the base product type and a group of coefficients for distinct attributes, which are distinct only for each type of the one or more products.

Figure 3:
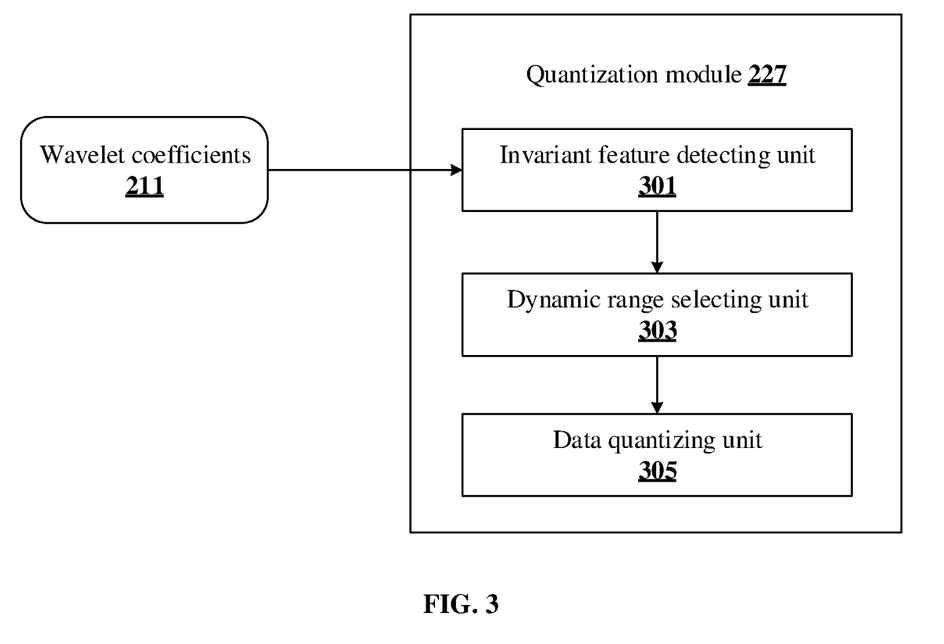
FIG. 3 shows a detailed block diagram of a quantization module in accordance with some embodiments of the present disclosure.

In an embodiment, the quantization module 227 may be configured for quantizing the dynamic set of invariant features 213 based on the predetermined quantization threshold and then associating a unique representative coefficient signature for each group in the dynamic set of the invariant features. As shown in FIG. 3, the quantization module 227 may include an invariant feature detecting unit 301, a dynamic range selecting unit 303 and a data quantizing unit 305.

In an embodiment, the invariant feature detecting unit 301 may be configured for receiving the wavelet coefficients 211 corresponding to each of the one or more images of the one or more products 101. After receiving the wavelet coefficients 211, the invariant feature detecting unit 301 may detect the set of invariant features 213 and/or coefficients that represent each of the one or more images and discard the remaining features. In an embodiment, the invariant features may be the wavelet coefficients 211 that take the same values independent of the orientation, size and other attributes of the one or more products. In an embodiment, the dynamic range selecting unit 303 may be configured for collecting the invariant features for the one or more images of the one or more products 101, which are of same type but vary in attributes and subsequently find dynamic coefficients corresponding to each of the one or more images.

The data quantizing unit 305 may be configured for creating the quantized coefficients for each element in the dynamic set of invariant features 213 using a threshold quantization value set based on the variation of each wavelet coefficients 211 in the group. Further, the quantization unit may store the quantized coefficients in the database 105 for further reference. In an embodiment, the threshold quantization value may be determined as a value which is in between the levels required to be rounded off.

In an embodiment, the fault detection module 229 may be configured for detecting the faults in the one or more products based on comparison of coefficient signatures associated with the one or more products with the representative coefficient signature of each group in the dynamic set of invariant features 213. In an embodiment, the fault detection module 229 may detect the faults by identifying mismatch of the coefficient signatures, associated with the one or more products, with the representative coefficient signature of each group in the dynamic set of invariant features 213.

In an embodiment, if the product being reviewed or analysed for faults is a compound or a complex product comprising a combination of one or more sub-products (for example a gear box), then such a complex object needs to be segmented before taking further for fault detection. The segmentation of the complex object allows the fault detection system 103 to isolate the individual sub-products of interest from the rest of the sub-products. Subsequently, the quantization coefficients may be created for all the objects of the complex product or for all the sub-products of the segmented complex product.

In an embodiment, the fault detection module 229 may comprise a search-handling unit configured to receive the quantized coefficients for a given product from the data quantizing unit 305 and use a preconfigured optimized search technique to search the set of given quantized coefficients among the set of quantized coefficients for all the objects in the database 105. Generally, a heap sort, B-tree or any other variations of the B-tree may be used to perform the search. In one embodiment, Grover's search may also be used to perform the search, since the Grover's search takes least time among all the available search techniques. Here, the quantization signature associated with the product may be used as the search key. Since the search is performed on the dataset of the representative signatures, there will either be a perfect match or no match at all, and as a result, the Grover's search technique may be most efficient.

In an embodiment, upon detecting the faults in the one or more products, the fault detection system 103 may render the detected faults and validation results to a user through a user interface associated with the fault detection system 103. In an embodiment, if the object match is not found by the search algorithm either for individual product or for the complex product, the product may be suspected to be faulty. Subsequently, it may be validated using its signature and minimum non-faulty threshold values. If it is not within the range of the threshold values, then the object may be considered and labelled as faulty. In an embodiment, information such as whether the object is faulty or not, the type of fault, the total number of faults, product type and total number of faults for each product type etc., may be collected as a report and rendered as output to the user through the user interface. Using this information, the user may perform one or more actions on the faulty products, such as discarding the faulty products, to effectively handle the faulty products.

Figure 4:
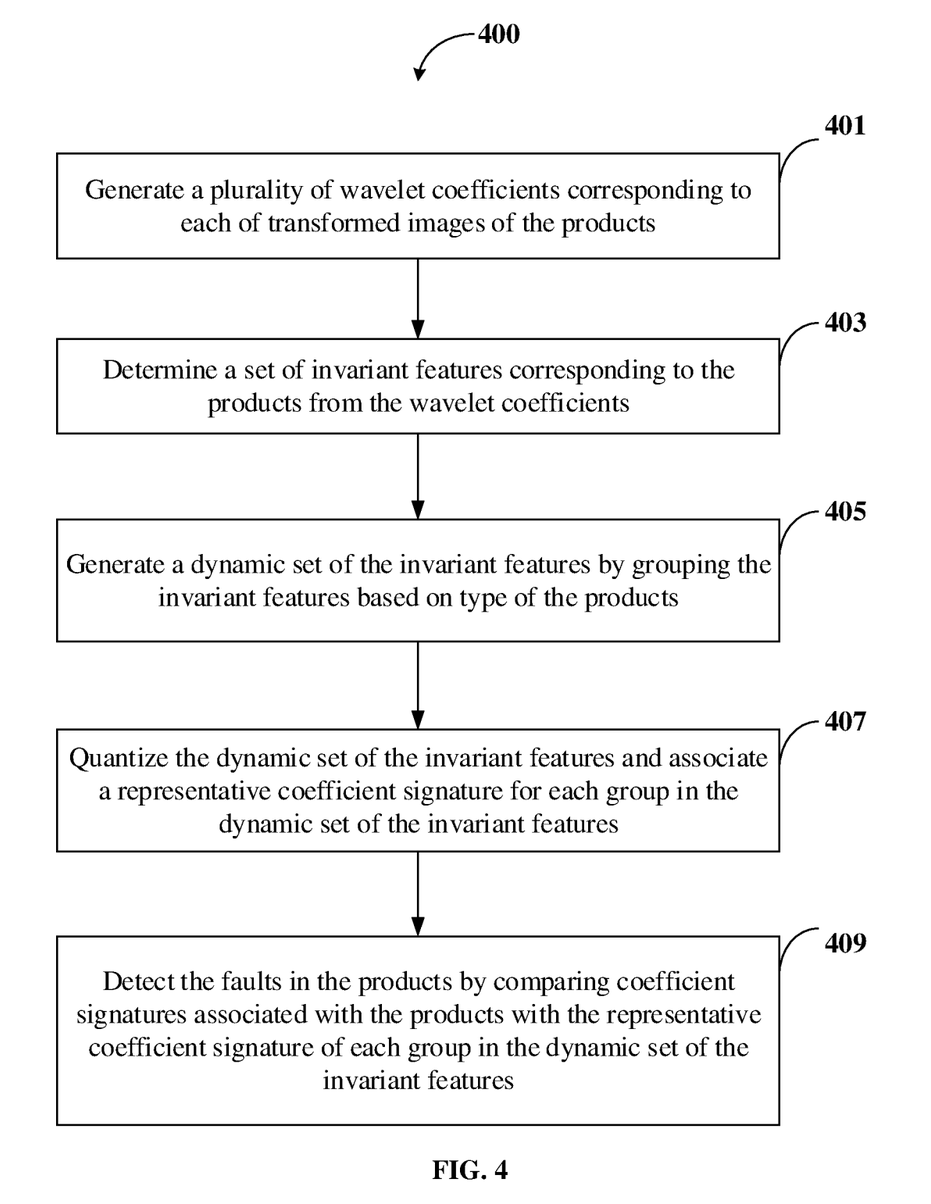
FIG. 4 shows a flowchart illustrating a method of detecting faults in one or more products in accordance with some embodiments of the present disclosure.

FIG. 4 shows a flowchart illustrating method of detecting faults in one or more products in accordance with some embodiments of the present disclosure.

As illustrated in FIG. 4, the method 400 may include one or more blocks illustrating a method for detecting faults in one or more products using a fault detection system 103 illustrated in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, the method 400 includes generating, by the fault detection system 103, a plurality of wavelet coefficients 211 corresponding to each of one or more transformed images of the one or more products 101. In an embodiment, each of the plurality of wavelet coefficients 211 may correspond to at least one characteristic of the one or more products. In an embodiment, the one or more transformed images of the one or more products 101 may be obtained by processing one or more images of the one or more products 101 using predetermined image transformation techniques. As an example, the at least one characteristic of the one or more products may include, without limitation, at least one of type of the one or more products, shape of the one or more products, dimensions of the one or more products and colour of the one or more products.

At block 403, the method 400 includes determining, by the fault detection system 103, a set of invariant features 213, corresponding to the one or more products, from the plurality of wavelet coefficients 211. In an embodiment, the set of invariant features 213 may be determined by comparing values of the plurality of wavelet coefficients 211 with corresponding predetermined threshold coefficient values. In an embodiment, the predetermined threshold coefficient value may be computed based on values of the wavelet coefficients 211 corresponding to a plurality of historical images of the one or more products 101.

At block 405, the method 400 includes generating, by the fault detection system 103, a dynamic set of invariant features 213 by grouping the invariant features into a set of groups based on the type of the one or more products. In an embodiment, each group in the set of groups may include wavelet coefficients 211 distinct to the particular type of the one or more products.

At block 407, the method 400 includes quantizing, by the fault detection system 103, the dynamic set of invariant features 213 based on a predetermined quantization threshold and by associating a representative coefficient signature for each group in the dynamic set of invariant features 213. In an embodiment, the set of invariant features 213 may include wavelet coefficients 211 that are common across each of the one or more transformed images and whose values are comparable to the predetermined threshold coefficient values.

At block 409, the method 400 includes detecting, by the fault detection system 103, the faults in the one or more products based on comparison of coefficient signatures associated with the one or more products with the representative coefficient signature of each group in the dynamic set of invariant features 213. In an embodiment, the faults may be detected by identifying a mismatch of coefficient signatures, associated with the one or more products, with the representative coefficient signature of each group in the dynamic set of invariant features 213.

In an embodiment, comparing the coefficient signatures may further comprise determining if the product is a compound product comprising a plurality of sub-products. If the product is a complex product, then each of the one or more transformed images of the one or more products 101 may be segmented into distinct images for isolating each of the plurality of sub-products and perform a separate comparison.

In an embodiment, upon detecting faults in the one or more products the information related to the faults may be rendered on a user interface associated with the fault detection system 103, which may be used to select the one or more faulty products and separate them from the non-faulty products.

Computer System

Figure 5:
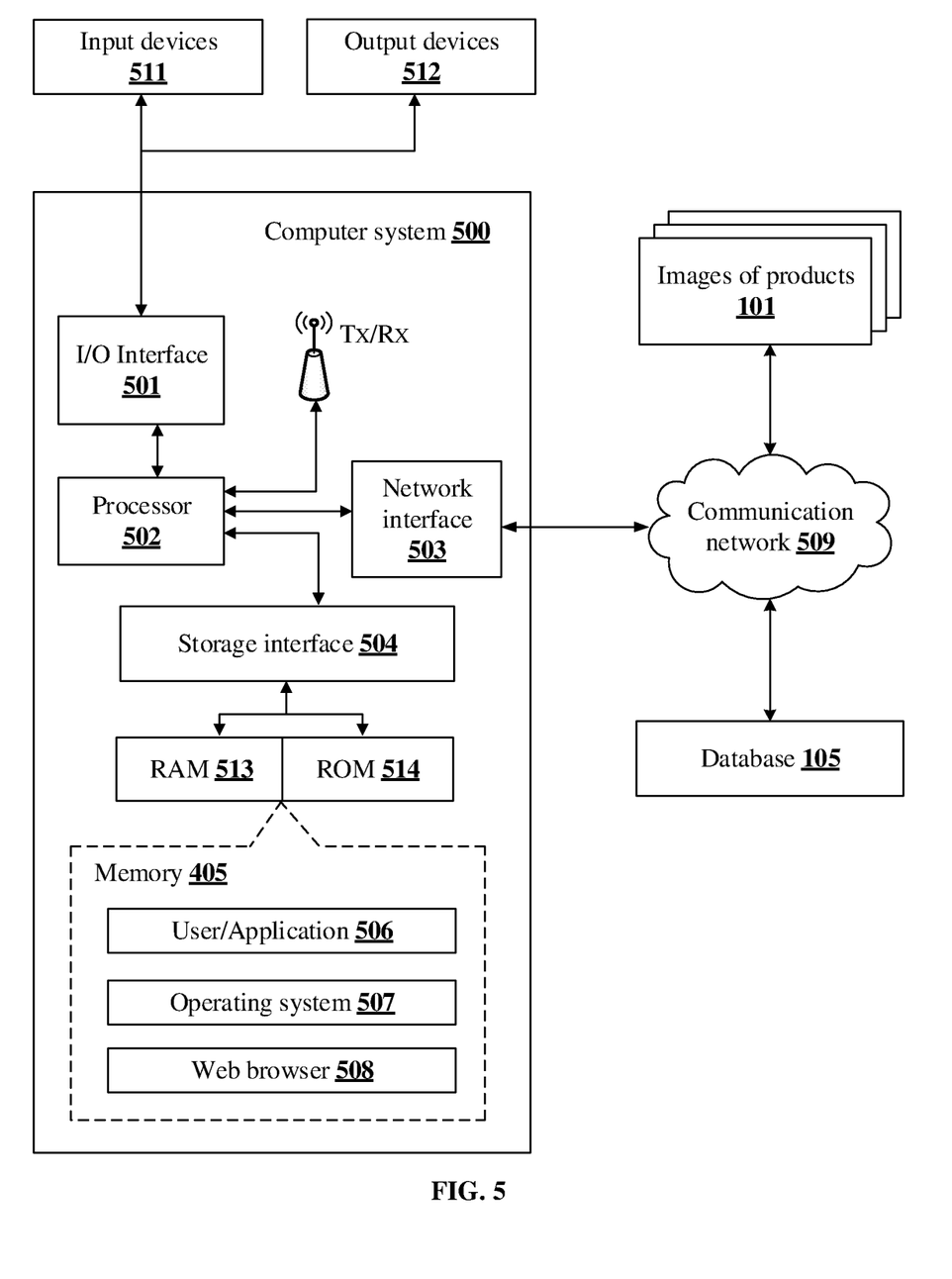
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be the fault detection system 103 illustrated in FIG. 1, which may be used for detecting faults in the one or more products across a manufacturing process. The computer system 500 may include a central processing unit ("CPU" or "processor") 502. The processor 502 may comprise at least one data processor for executing program components for executing user- or system-generated business processes. A user may include an application developer, a programmer, an organization or any system/sub-system being operated parallelly to the computer system 500. The processor 502 may include specialized processing units such as integrated system (bus) controllers, memory management control units, floating point units, graphics processing units, digital signal processing units, etc.

The processor 502 may be disposed in communication with one or more Input/Output (I/O) devices (511 and 512) via I/O interface 501. The I/O interface 501 may employ communication protocols/methods such as, without limitation, audio, analog, digital, stereo, IEEE®-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE® 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE® 802.11a/b/g/n/x, etc. Using the network interface 503 and the communication network 509, the computer system 500 may connect with an image capturing unit in a manufacturing plant to receive one or more images of one or more products 101. Additionally, the communication network 509 may be used for receiving required data and information from a database 105 associated with the computer system 500.

In an implementation, the communication network 509 may be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiments of the Present Disclosure are Illustrated Herein

In an embodiment, the present disclosure provides an automated method for dynamically detecting faults in one or more products being produced in a manufacturing plant.

In an embodiment, the proposed fault detection method consumes reduced local memory compared to the conventional fault detection mechanisms, which require huge data repository of images of all the faults for training a model.

In an embodiment, the method of present disclosure robust and universal fault detection mechanism, which detects faults in one or more products irrespective of size and type of the one or more products, illuminations and orientations of the product images.

In an embodiment, the method of present disclosure accepts and/or provides anticipated detection results for a wide range of variations and does not require training.

In an embodiment, the method of present disclosure detects faults with higher accuracy since the fault detection is performed based on wavelet coefficients 211 retrieved from the images of one or more products.

As stated above, it shall be noted that the method and the fault detection system of the present disclosure may be used to overcome various technical problems related to automated fault detection in one or more products in a manufacturing plant. Specifically, the method and the fault detection system disclosed herein aim to reduce training requirements (both in terms of time required and size of training dataset) and enhance accuracy of the fault detection. In other words, the disclosed method and the fault detection system have a practical application and provide a technically advanced solution to the technical problems associated with the existing automated code generation mechanisms.

The aforesaid technical advancement and practical application of the proposed method may be attributed to the aspects of a) generating a dynamic set of invariant features by grouping the invariant features based on type of the one or more products and b) quantizing the dynamic set of invariant features based on a predetermined quantization threshold, as disclosed in steps 3 and 4 of the independent claims 1 and 7 of the present disclosure.

In light of the technical advancements provided by the disclosed method and fault detection system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device/article is described herein (whether they cooperate), it will be clear that a single device/article may be used in place of the more than one device/article or a different number of devices/articles may be used instead of the shown number of devices or programs. The functionality and/or features of a device may be alternatively embodied by one or more other devices which are not explicitly described as having such functionality/features. Thus, other embodiments of invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Referral Numerals:

| Reference Number | Description |
| --- | --- |
| 100 | Environment |
| 101 | Images of one or more products |
| 103 | Fault detection system |
| 105 | Database |
| 107 | Information related to faults |
| 201 | I/O Interface |
| 203 | Processor |
| 205 | Memory |
| 207 | Data |
| 209 | Modules |
| 211 | Wavelet coefficients |
| 213 | Set of invariant features |
| 215 | Quantization thresholds |
| 217 | Other data |
| 219 | Image transformation unit |
| 221 | Coefficient generating module |
| 223 | Feature determination module |
| 225 | Set generation module |
| 227 | Quantization module |
| 229 | Fault detection module |
| 231 | Other modules |
| 301 | Invariant feature detecting unit |
| 303 | Dynamic range selecting unit |
| 305 | Data quantizing unit |
| 500 | Exemplary computer system |
| 501 | I/O Interface of the exemplary computer system |
| 502 | Processor of the exemplary computer system |
| 503 | Network interface |
| 504 | Storage interface |
| 505 | Memory of the exemplary computer system |
| 506 | User/Application |
| 507 | Operating system |
| 508 | Web browser |
| 509 | Communication network |
| 511 | Input devices |
| 512 | Output devices |
| 513 | RAM |
| 514 | ROM |

What is claimed is:

1. A method for detecting faults in products, the method comprising:

generating, by a fault detection system, a plurality of wavelet coefficients corresponding to one or more transformed images of one or more products, wherein each of the plurality of wavelet coefficients correspond to at least one characteristic of each of the one or more products;

determining, by the fault detection system, a set of invariant features, corresponding to each of the one or more products, from the plurality of wavelet coefficients by comparing values of the plurality of wavelet coefficients with corresponding predetermined threshold coefficient values;

generating, by the fault detection system, a dynamic set of invariant features by grouping the invariant features into a set of groups based on type of the one or more products, wherein each group in the set of groups comprises wavelet coefficients distinct to the type of the one or more products;

quantizing, by the fault detection system, the dynamic set of invariant features based on a predetermined quantization threshold and associating a representative coefficient signature for each group in the dynamic set of invariant features; and detecting, by the fault detection system, the faults in the one or more products based on comparison of coefficient signatures associated with each of the one or more products with the representative coefficient signature of each group in the dynamic set of invariant features, wherein detecting the faults comprising identifying mismatch of coefficient signatures, associated with each of the one or more products, with the representative coefficient signature of each group in the dynamic set of invariant features.

2. The method as claimed in claim 1, wherein the one or more transformed images of the one or more products are obtained by processing one or more images of each of the one or more products using predetermined image transformation techniques, and wherein the at least one characteristic of the one or more products comprises at least one of type of the one or more products, shape of the one or more products, dimensions of the one or more products and colour of the one or more products.

3. The method as claimed in claim 1, wherein the predetermined threshold coefficient values are computed based on values of the wavelet coefficients corresponding to a plurality of historical images of the one or more products.

4. The method as claimed in claim 1, wherein the set of invariant features comprises wavelet coefficients that are common across each of the one or more transformed images and having values comparable to the predetermined threshold coefficient values.

5. The method as claimed in claim 1, wherein comparing the coefficient signatures further comprises:

determining if the one or more products are a compound product comprising a plurality of sub-products; and segmenting the one or more transformed images of the one or more products into distinct images for isolating each of the plurality of sub-products and perform a separate comparison.

6. The method as claimed in claim 1 further comprises rendering, upon detecting faults in the one or more products, information related to the faults on a user interface associated with the fault detection system.

7. A fault detection system for detecting faults in products, the fault detection system comprising:

a processor; and a memory, communicatively coupled to the processor, wherein the memory stores processor-executable instructions, which on execution, cause the processor to:

generate a plurality of wavelet coefficients corresponding to one or more transformed images of one or more products, wherein each of the plurality of wavelet coefficients correspond to at least one characteristic of each of the one or more products;

determine a set of invariant features, corresponding to each of the one or more products, from the plurality of wavelet coefficients by comparing values of the plurality of wavelet coefficients with corresponding predetermined threshold coefficient values;

generate a dynamic set of invariant features by grouping the invariant features into a set of groups based on type of the one or more products, wherein each group in the set of groups comprises wavelet coefficients distinct to the type of the one or more products;

quantize the dynamic set of invariant features based on a predetermined quantization threshold and associating a representative coefficient signature for each group in the dynamic set of invariant features; and detect the faults in the one or more products based on comparison of coefficient signatures associated with each of the one or more products with the representative coefficient signature of each group in the dynamic set of invariant features, wherein the faults are detected by identifying mismatch of coefficient signatures, associated with each of the one or more products, with the representative coefficient signature of each group in the dynamic set of invariant features.

8. The fault detection system as claimed in claim 7, wherein the processor obtains the one or more transformed images of the one or more products by processing one or more images of each of the one or more products using predetermined image transformation techniques, and wherein the at least one characteristic of each of the one or more products comprises at least one of type of the one or more products, shape of the one or more products, dimensions of the one or more products and colour of the one or more products.

9. The fault detection system as claimed in claim 7, wherein the processor computes the predetermined threshold coefficient values based on values of the wavelet coefficients corresponding to a plurality of historical images of the one or more products.

10. The fault detection system as claimed in claim 7, wherein the set of invariant features comprises wavelet coefficients that are common across each of the one or more transformed images and having values comparable to the predetermined threshold coefficient values.

11. The fault detection system as claimed in claim 7, wherein the processor compares the coefficient signatures by:

determining if the one or more products are a compound product comprising a plurality of sub-products; and segmenting the one or more transformed images of the one or more products into distinct images for isolating each of the plurality of sub-products and perform a separate comparison.

12. The fault detection system as claimed in claim 7, wherein the processor is further configured to render, upon detecting the faults in the one or more products, information related to the faults on a user interface associated with the fault detection system.

13. A non-transitory computer readable medium including instructions stored thereon that when processed by at least one processor cause a fault detection system to perform operations comprising:

generating a plurality of wavelet coefficients corresponding to one or more transformed images of the one or more products, wherein each of the plurality of wavelet coefficients correspond to at least one characteristic of each of the one or more products;

determining a set of invariant features, corresponding to each of the one or more products, from the plurality of wavelet coefficients by comparing values of the plurality of wavelet coefficients with corresponding predetermined threshold coefficient values;

generating a dynamic set of invariant features by grouping the invariant features into a set of groups based on type of the one or more products, wherein each group in the set of groups comprises wavelet coefficients distinct to the type of the one or more products;

quantizing the dynamic set of invariant features based on a predetermined quantization threshold and associating a representative coefficient signature for each group in the dynamic set of invariant features; and detecting the faults in the one or more products based on comparison of coefficient signatures associated with each of the one or more products with the representative coefficient signature of each group in the dynamic set of invariant features, wherein the faults are detected by identifying mismatch of coefficient signatures, associated with each of the one or more products, with the representative coefficient signature of each group in the dynamic set of invariant features.

14. The non-transitory computer readable medium as claimed in claim 13, wherein the one or more transformed images of the one or more products are obtained by processing one or more images of each of the one or more products using predetermined image transformation techniques, and wherein the at least one characteristic of each of the one or more products comprises at least one of type of the one or more products, shape of the one or more products, dimensions of the one or more products and colour of the one or more products.

15. The non-transitory computer readable medium as claimed in claim 13, wherein the predetermined threshold coefficient values are computed based on values of the wavelet coefficients corresponding to a plurality of historical images of the one or more products.

16. The non-transitory computer readable medium as claimed in claim 13, wherein the set of invariant features comprises wavelet coefficients that are common across each of the one or more transformed images and having values comparable to the predetermined threshold coefficient values.

17. The non-transitory computer readable medium as claimed in claim 13, wherein the coefficient signatures are compared by:
  determining if the one or more products are a compound product comprising a plurality of sub-products; and
  segmenting the one or more transformed images of the one or more products into distinct images for isolating each of the plurality of sub-products and perform a separate comparison.

18. The non-transitory computer readable medium as claimed in claim 13, wherein information related to the faults are rendered on a user interface associated with the fault detection system upon detecting the faults in the one or more products.

* * * * *